US012342313B2

(12) United States Patent
Kerr et al.

(10) Patent No.: US 12,342,313 B2
(45) Date of Patent: *Jun. 24, 2025

(54) LOCATION POSITIONING ENGINE SYSTEM AND METHOD

(71) Applicant: NEXRF CORP., Reno, NV (US)

(72) Inventors: Michael A. Kerr, Reno, NV (US); David Stewart, Stateline, NV (US)

(73) Assignee: NEXRF CORP., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,367

(22) Filed: Jul. 14, 2023

(65) Prior Publication Data

US 2024/0015688 A1 Jan. 11, 2024

Related U.S. Application Data

(63) Continuation of application No. 15/470,794, filed on Mar. 27, 2017, now Pat. No. 11,706,733, which is a (Continued)

(51) Int. Cl.
*H04W 64/00* (2009.01)
*G01S 1/00* (2006.01)
(Continued)

(52) U.S. Cl.
CPC .............. *H04W 64/00* (2013.01); *G01S 1/00* (2013.01); *G01S 1/68* (2013.01); *G01S 5/0027* (2013.01); *G01S 5/0063* (2013.01); *G01S 5/0226* (2013.01); *G01S 5/0242* (2013.01); *G01S 5/0252* (2013.01); *G01S 5/0263* (2013.01); *G01S 5/0289* (2013.01); *H04W 4/02* (2013.01); *H04W 4/021* (2013.01); *H04W 4/025* (2013.01); *H04W 4/029* (2018.02); *H04W 4/30* (2018.02)

(58) Field of Classification Search
None
See application file for complete search history.

(56) References Cited

U.S. PATENT DOCUMENTS 5,761,647 A 6/1998 Boushy
5,768,382 A 6/1998 Schneier et al.
(Continued)

*Primary Examiner* — Jason T Yen
(74) *Attorney, Agent, or Firm* — Kerr IP Group, LLC

(57) ABSTRACT

An indoor mapping system utilizing beacons is described. The system includes a premises map, a beacon disposed within the premises, a plurality of measured signal strengths, and a wireless device. The beacon location is layered on the map, and the measured signal strengths are captured from the beacon. The wireless device includes an indoor positioning module, and the wireless device receives a beacon signal when it is within a broadcast range of the beacon. The wireless device determines a signal strength of the received beacon signal. The indoor positioning module associates the measured signal strengths with their corresponding beacon location. The beacon location is further associated with a plurality of calculated signal strengths that are generated from the measured signal strengths. The indoor positioning module determines that the wireless device is at a location by comparing the received beacon identifiers and signal strengths with the calculated signal strengths.

18 Claims, 18 Drawing Sheets

Related U.S. Application Data continuation of application No. 13/153,248, filed on Jun. 3, 2011, now Pat. No. 9,615,347, which is a continuation-in-part of application No. 12/821,852, filed on Jun. 23, 2010, now Pat. No. 8,738,024.

(60) Provisional application No. 61/223,565, filed on Jul. 7, 2009.

(51) Int. Cl.
*G01S 1/68* (2006.01)
*G01S 5/00* (2006.01)
*G01S 5/02* (2010.01)
*H04W 4/02* (2018.01)
*H04W 4/021* (2018.01)
*H04W 4/029* (2018.01)
*H04W 4/30* (2018.01)

(56) References Cited

U.S. PATENT DOCUMENTS

| | | | |
|---|---|---|---|
| 5,851,149 A | 12/1998 | Xidos et al. | |
| 6,001,016 A | 12/1999 | Walker et al. | |
| 6,230,205 B1 | 5/2001 | Garrity et al. | |
| 6,508,709 B1 | 1/2003 | Karmarkar | |
| 6,640,218 B1 | 10/2003 | Golding et al. | |
| 6,709,333 B1 | 3/2004 | Bradford et al. | |
| 6,719,631 B1 | 4/2004 | Tulley et al. | |
| 6,751,732 B2 | 6/2004 | Strobel et al. | |
| 6,875,110 B1 | 4/2005 | Crumby | |
| 7,830,250 B2 | 11/2010 | Huseth et al. | |
| 8,509,442 B2 | 8/2013 | Gavette | |
| 8,738,024 B1 | 5/2014 | Kerr et al. | |
| 2001/0044337 A1 | 11/2001 | Rowe et al. | |
| 2002/0142844 A1 | 10/2002 | Kerr | |
| 2002/0142846 A1 | 10/2002 | Paulsen | |
| 2002/0198775 A1 | 12/2002 | Ryan | |
| 2003/0036425 A1 | 2/2003 | Kaminkow et al. | |
| 2004/0023721 A1 | 2/2004 | Giobbi | |
| 2004/0255137 A1 | 12/2004 | Mng | |
| 2005/0076210 A1 | 4/2005 | Thomas et al. | |
| 2005/0085257 A1 | 4/2005 | Laird et al. | |
| 2005/0152305 A1 | 7/2005 | Ji et al. | |
| 2005/0215233 A1 | 9/2005 | Perera et al. | |
| 2005/0226423 A1 | 10/2005 | Li et al. | |
| 2005/0261063 A1 | 11/2005 | Boyd et al. | |
| 2006/0125693 A1* | 6/2006 | Recker | G01S 5/14 342/465 |
| 2006/0136742 A1 | 6/2006 | Giobbi | |
| 2006/0189382 A1 | 8/2006 | Muir et al. | |
| 2006/0194633 A1 | 8/2006 | Paulsen | |
| 2006/0287810 A1 | 12/2006 | Sadri et al. | |
| 2006/0287813 A1* | 12/2006 | Quigley | G01S 5/0236 701/533 |
| 2007/0060306 A1 | 3/2007 | Amaitis et al. | |
| 2007/0100963 A1 | 5/2007 | Ban et al. | |
| 2007/0136132 A1 | 6/2007 | Weiser et al. | |
| 2007/0167210 A1 | 7/2007 | Kelly et al. | |
| 2007/0184852 A1* | 8/2007 | Johnson | H04W 64/00 455/456.1 |
| 2007/0257831 A1* | 11/2007 | Mathews | G01S 5/0289 342/385 |
| 2007/0281692 A1 | 12/2007 | Bucher et al. | |
| 2007/0286369 A1 | 12/2007 | Gutt et al. | |
| 2008/0057894 A1 | 3/2008 | Aleksic et al. | |
| 2008/0064492 A1 | 3/2008 | Oosthoek | |
| 2008/0113785 A1 | 5/2008 | Alderucci et al. | |
| 2008/0153515 A1 | 6/2008 | Mock et al. | |
| 2008/0198001 A1* | 8/2008 | Sarma | G01S 1/68 340/8.1 |
| 2008/0207296 A1 | 8/2008 | Lutnick et al. | |
| 2008/0249833 A1 | 10/2008 | Ali et al. | |
| 2008/0280624 A1* | 11/2008 | Wrappe | G01S 5/0036 455/456.1 |
| 2009/0170614 A1 | 7/2009 | Herrmann et al. | |
| 2009/0197684 A1 | 8/2009 | Arezina et al. | |
| 2009/0254824 A1 | 10/2009 | Singh | |
| 2010/0022308 A1 | 1/2010 | Hartmann et al. | |
| 2010/0048242 A1 | 2/2010 | Rhoads et al. | |
| 2010/0211431 A1 | 8/2010 | Lutnick et al. | |
| 2010/0250939 A1 | 9/2010 | Adams et al. | |
| 2011/0078167 A1 | 3/2011 | Sundaresan et al. | |
| 2014/0295944 A1 | 10/2014 | Faircloth | |
| 2014/0310513 A1 | 10/2014 | Barney et al. | |
| 2015/0134949 A1 | 5/2015 | Baldwin | |
| 2017/0178157 A1 | 6/2017 | Jayaram | |
| 2017/0317981 A1 | 11/2017 | Klein | |

* cited by examiner

200

| User Profile | |
|---|---|
| User ID | 12345678 |
| Name | Joe Smith |
| Age | 35 |

| User Attribute | |
|---|---|
| User ID | 12345678 |
| Attribute ID | 11111111 |
| Attribute Category | Game |
| Attribute Value | Blackjack |

320

| Attribute Groups | |
|---|---|
| User ID | 12345678 |
| Attribute Group ID | 11111111 |

800

Associate Content with User Group Attributes

| | | |
|---|---|---|
| Content Item | Casino Floor ▼ | 802 |
| | 21 Tournament | |
| | Casino Floor | |
| | Room Service | |
| | Rewards/Points | |
| User Attribute Type | Age Range ▼ | 804 |
| | Age | |
| | Age Range | |
| | Game | |
| | Gender | |
| User Attribute Value | 21 and over ▼ | 806 |
| | 21 and over | |
| | 25-34 | |
| | 35-44 | |
| Level | 1 ▼ | 808 |
| | 1 | |
| | 2 | |
| | 3 | |
| Relevance Weighting | 90 | 810 |

Associate Content with User Group Attributes

| | | |
|---|---|---|
| Content Item | 21 Tournament ▼ | 852 |
| | 21 Tournament | |
| | Casino Floor | |
| | Room Service | |
| | Rewards/Points | |
| User Attribute Type | Game ▼ | 854 |
| | Age | |
| | Age Range | |
| | Game | |
| | Gender | |
| User Attribute Value | Blackjack ▼ | 856 |
| | Blackjack | |
| | Poker | |
| | Roulette | |
| Level | 2 | 860 |
| Parent Content Item | Casino Floor ▼ | 862 |
| | Casino Floor | |
| | Room Service | |
| | Rewards/Points | |
| Relevance Weighting | 80 | 858 |

Figure 8B

| Embodiment 1: Position Determination by Maximum Received Signal Strength Example 1 ||
|---|---|
| Beacon | Signal Strength |
| Beacon 1 | -45 dB |
| Beacon 2 | -50 dB |
| Beacon 3 | -60 dB |
| Wireless Handset located in Content Bubbles 1 and 2 ||

Figure 11A

| Embodiment 1: Position Determination by Maximum Received Signal Strength Example 2 ||
|---|---|
| Beacon | Signal Strength |
| Beacon 1 | -45 dB |
| Beacon 2 | -50 dB |
| Beacon 3 | -45 dB |
| Wireless Handset located in Content Bubbles 1 and 3 ||

Figure 11B

| Embodiment 2: Position Determination by Threshold Signal Strength Example 1 ||
|---|---|
| Beacon | Signal Strength |
| Beacon 1 | -45 dB |
| Beacon 2 | -60 dB |
| Beacon 3 | -55 dB |
| Wireless Handset located in Content Bubbles 1 and 2 ||

Figure 11C

| Embodiment 2: Position Determination by Threshold Signal Strength Example 1 ||
|---|---|
| Beacon | Signal Strength |
| Beacon 1 | -55 dB |
| Beacon 2 | -55 dB |
| Beacon 3 | -55 dB |
| Wireless Handset located in no Content Bubbles ||

Figure 11D

| Embodiment 2: Position Determination by Threshold Signal Strength and Maximum Received Signal Strength Example 1 ||
|---|---|
| Beacon | Signal Strength |
| Beacon 1 | -25 dB |
| Beacon 2 | -30 dB |
| Beacon 3 | -25 dB |
| Wireless Handset located in Content Bubbles 1, 2 and 3 ||

Figure 11E

LOCATION POSITIONING ENGINE SYSTEM AND METHOD

CROSS REFERENCE

This utility patent application is a Continuation of patent application Ser. No. 15/470,794 entitled LOCATION POSITIONING ENGINE SYSTEM AND METHOD, filed Mar. 27, 2017; which is a Continuation of patent application Ser. No. 13/153,248 (now U.S. Pat. No. 9,615,347) entitled LOCATION POSITIONING ENGINE SYSTEM AND METHOD, filed Jun. 3, 2011, which is a Continuation-In-Part of patent application Ser. No. 12/821,852 (now U.S. Pat. No. 8,738,024) entitled DELIVERING CONTENT WITHIN A BOUNDARY WITH BEACONS, filed Jun. 23, 2010; which claims the benefit of provisional patent application 61/223,565 entitled MOBILE AUTONOMOUS DYNAMIC GRAPHICAL USER INTERFACE APPLICATION FRAMEWORK, filed Jul. 7, 2009.

The above patent applications are hereby incorporated by reference in this patent application.

FIELD

The present invention relates to indoor positioning. More particularly, the present invention relates to determining the indoor position of a mobile device with fixed sensors that are communicatively coupled to a network.

BACKGROUND

The wireless handset presents new opportunities for merchants to communicate with customers. The merchant may wish to provide information to the customer regarding a product or service, offer incentives to the customer to enter a premises or make a purchase, or provide services that utilize the capabilities of the wireless handset.

When a merchant premises is large or the merchant offers a complex variety of products, the customer may require assistance to find a desired product or to attain the information needed about a product to make a purchase decision. An employee of the merchant may be able to provide the needed assistance provided the employee's training and knowledge is sufficient. If the employee is not available or unable to assist, the customer may use a web browser on a wireless handset to find additional information about a desired product or service. However, the small display and interface format of a wireless handset may hinder the customer's effort to use a wireless handset to find information. Thus, there is a need for a custom interface specific to the merchant's offerings, allowing the merchant to provide information to the customer in an efficient and easily navigable fashion.

A merchant wishing to advertise to the customer may wish to leverage the functionality of the customer's wireless handset by providing highly targeted advertising to the user. Although a merchant may use a sign or an LCD display to provide advertising at a specific location on the merchant premises, these advertising mechanisms will typically be directed at the entire range of potential customer demographics, due to the inability of these mechanisms to distinguish among customers. There is a need for a platform allowing the merchant to provide advertising to the customer taking into account the customer's location on or near the merchant premises and personal information about the customer which the customer has chosen to make available to the merchant.

Merchants having loyalty programs or other programs to increase interactions with the customer may rely on postal mail or e-mail to communicate with customers. However, the merchant lacks a means to incorporate the program into the customer experience on the merchant premises. Thus, there is a need for an application running on a wireless handset that allows a merchant to provide the benefits of the loyalty program to the customer while the customer is on or near the merchant's premises.

While the customer may realize a number of benefits from the solutions described above, the customer will be discouraged if the merchant's use of the application fails to meet the customer's needs or exceeds the customer's desire for the information that can be provided to the wireless handset. There is a need for a feedback system which allows the customer to chose or rank which of the provided information is desired and/or helpful. Such a feedback system would ensure that the customer and other future customers would continue to receive the most desirable and useful information provided by the merchant.

Further, customers may only be willing to share personal information that will allow the provided information to be targeted at the customer if the customer has control over what information is provided to the merchant. Thus, there is a need for an information privacy management system which the customer uses to control the information available to the merchant.

SUMMARY

An indoor mapping system and method are described. The system includes a physical premises map, one or more beacons disposed within the physical premises, at least one beacon location, a plurality of measured signal strengths, and a wireless device. The beacon location is layered on the physical premises map, and the plurality of measured signal strengths are captured from the beacons. The wireless device includes an indoor positioning module, and the wireless device receives one or more beacon identifier when it is within a broadcast range of the beacons. The wireless device also determines a signal strength of the received beacon identifiers. The indoor positioning module associates the measured signal strengths from the beacons with their corresponding beacon location. Each beacon location is further associated with a plurality of calculated signal strengths that are generated from the measured signal strengths. The indoor positioning module also determines that the wireless device is at a beacon location by comparing the received beacon identifiers and signal strengths with the calculated signal strengths.

In some embodiments, the beacon location is associated with a merchant premises.

In some embodiments, the wireless device includes a mobile phone.

In one embodiment, the method proceeds by receiving a physical premises map. One or more beacons is located on the physical premises map. Each beacon transmits a signal containing a unique beacon identifier. A wireless device including an indoor positioning module is then enabled to determine a received beacon signal strength associated with each beacon detected by the wireless device. The indoor positioning module is enabled to determine that the wireless device is at a beacon location by comparing the one or more beacon identifier and received signal strength with the plurality of calculated signal strengths.

DRAWINGS

The present invention will be more fully understood by reference to the following drawings which are for illustrative, not limiting, purposes.

FIG. 2 shows an illustrative database table entry for a user profile.

FIGS. 8A-8B show an illustrative content administrator interface for creating content connections.

FIGS. 11A-11E show illustrative examples of wireless handset positions as determined from received signals.

DESCRIPTION

Persons of ordinary skill in the art will realize that the following description is illustrative and not in any way limiting. Other embodiments of the claimed subject matter will readily suggest themselves to such skilled persons having the benefit of this disclosure.

A location positioning engine (LPE) for determining the location of a user's wireless handset within a premises is described. A content administrator submits a premises map to a server via a user interface. The content administrator then indicates the location of signal beacons on the premises with the user interface. As a user moves about a premises, signals from beacons distributed throughout the premises are received at the user's wireless handset. The content administrator uses the user interface to indicate content which the owner wishes for the user to receive when the user receives signals from the premises. The content information is stored on a server. The content is provided to the user's wireless handset from the server when the user's wireless handset detects that the user has entered the premises.

In some embodiments, the content administrator defines a content bubble comprising a geofence outlining all or a subset of the premises. The content administrator may indicate content to be received by a user when the user enters a content bubble within the premises.

In another embodiment, the content administrator may associate content with one or more user attribute. The user attribute may be stored on the server as information made available to the merchant by the customer through a user profile. Alternatively, the user attribute may be information the merchant has collected about or generated for a customer based on, for example, the customer's transactional history for the merchant.

The content administrator may further associate the content with a time range. The wireless handset communicates with a server to request content for the user. The server applies information stored in the user profile to make a determination of content to be targeted at the user. The server communicates with the wireless device to deliver the content.

Figure 1:
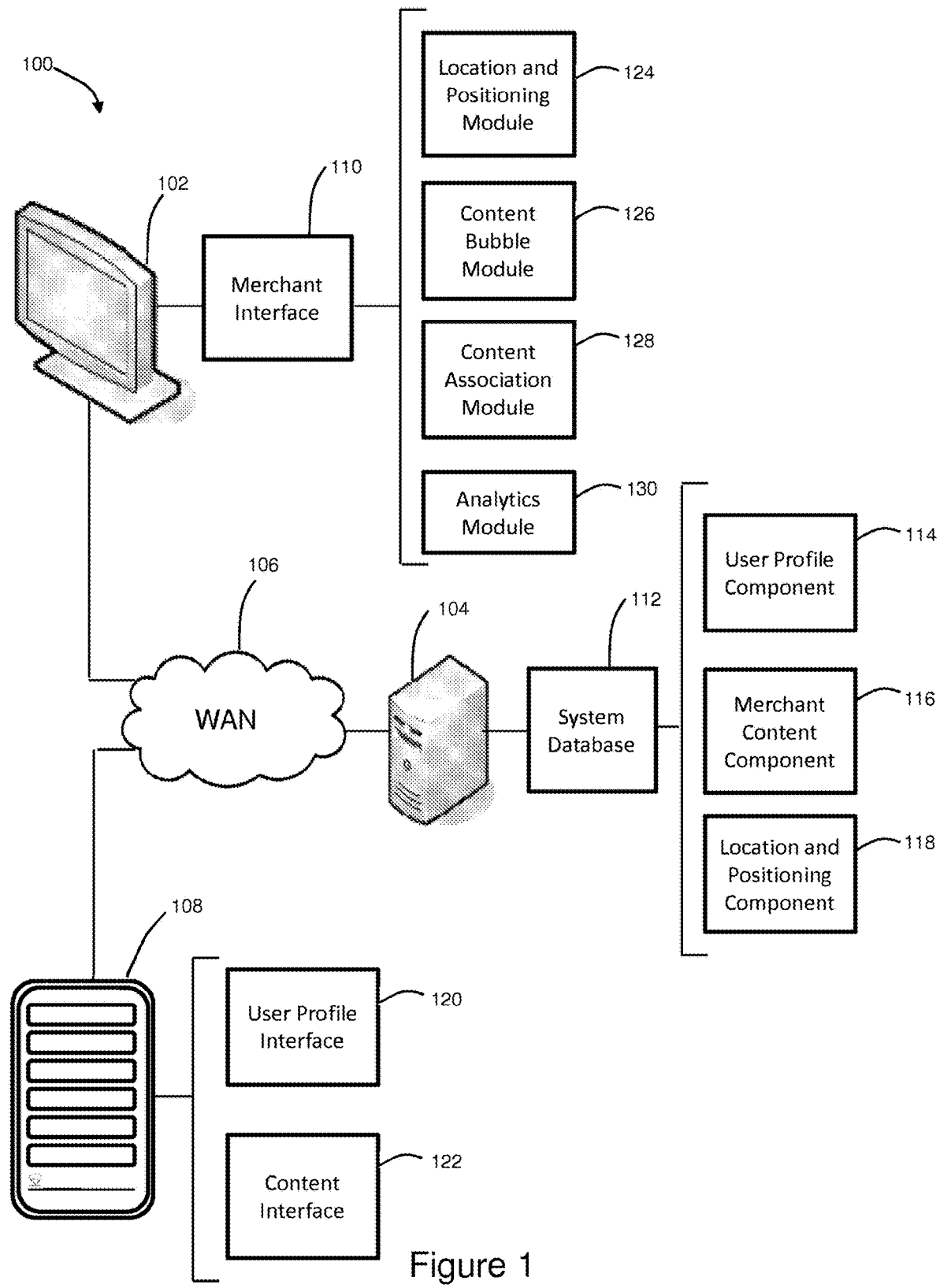
FIG. 1 shows an illustrative system architecture for a merchant content delivery system.

Referring to FIG. 1, an illustrative system architecture for a merchant content delivery system is shown. The system architecture comprises a merchant terminal 102, a server 104, a wireless network 106 and a wireless handset 108.

The merchant terminal 102 is a computing device capable of presenting a user interface to the content administrator for exchanging data with server 104. The merchant terminal may be, for example, a personal computer or a laptop.

The wireless handset 108 may be a mobile handset, mobile phone, wireless phone, portable cell phone, cellular phone, portable phone, a personal digital assistant (PDA), a tablet, a portable media device, or any type of mobile terminal which is regularly carried by a user and has all the elements necessary for operation in a wireless communication system. The wireless communications include, by way of example and not of limitation, CDMA, WCDMA, GSM or UMTS or any other wireless communication system such as wireless local area network, WLAN, Wi-Fi or WiMAX. It shall be appreciated by those of ordinary skill in the art that the term wireless handset, mobile handset, wireless phone, and mobile phone are interchangeable.

The wireless handset is in communication with an antenna. The antenna may be one of a plurality of base station antennas associated with a cellular phone network, or an antenna associated with wireless local area network access point, and may use Wi-Fi or WiMAX, or other such networking protocols.

Merchant terminal 102 and wireless handset 108 may be communicatively coupled to server 104 via wireless network 106 such as a wide area network. The wireless network could alternatively be a MAN, LAN or other network to facilitate the transmission of data between remote devices.

The software associated with merchant terminal 102 comprises a merchant interface application 110. The merchant interface application may be installed on the merchant terminal. Alternately, the merchant interface may run on a remote source and accessed by the merchant terminal via the wireless network 106. For example, the merchant interface application may be accessed via an internet browser.

The software associated with the wireless handset 108 comprises a user profile interface 120 and a content interface 122. The user profile interface and the content interface may be components of a single application or may be separate applications. The content interface and user profile interface may run on the handset or may run on a remote source and accessed by the wireless handset via the wireless network 106. The user of the wireless handset uses the user profile interface to provide information about the user to merchants.

A system database 112 runs on Server 104. System database 112 comprises a user profile component 114, a merchant content component 116, and a location and positioning component 118. The user profile component 114 comprises user attributes provided by the user through the user profile interface 120. In some embodiments, the user profile component further comprises user attributes generated by the merchant. For example, the merchant may generate a user attribute indicating the transaction history for a user. The merchant content component 116 comprises information provided by the content administrator through the merchant interface 110. The location and positioning component comprises information regarding the location of network objects within the merchant premises. The location and positioning component may additionally store the location of geofences within the merchant premises. In some embodiments, the location and positioning component stores the location of a merchant premises relative to a street map.

The merchant interface 110 may comprise one or more interface modules, such as a location and positioning module 124, a content bubble generation module 126, a content association module 128, and an analytics module 130. The location and positioning module 124 allows a content administrator to indicate the location of one or more network objects on the merchant premises. The content administrator is a person who uses the merchant interface 110 to provide content server 104. The location of the transmitters and/or transceivers is stored in the location and positioning database 118. The location and positioning module 124 may further allow the content administrator to indicate the location of the merchant premises on a mapping application. The location of the merchant premises is also stored in the location and positioning database. The content bubble module 126 allows the content administrator to delineate an area comprising part or all of the merchant premises. Content bubbles are described in more detail below. The content association module 128 allows the content administrator to create content associations in the merchant content database 116. The content associations may include associations of content with user attributes stored in the user profile database 116 and associations of content with content bubbles. The associations between the merchant content and user attributes are stored in the merchant content database 116. Merchant content is provided from merchant content database 116 to content interface 122 via wireless network 106. In some embodiments, an analytics module 130 allows the merchant to collect statistical information regarding the user reactions to content received at content interface 122.

Figure 2:
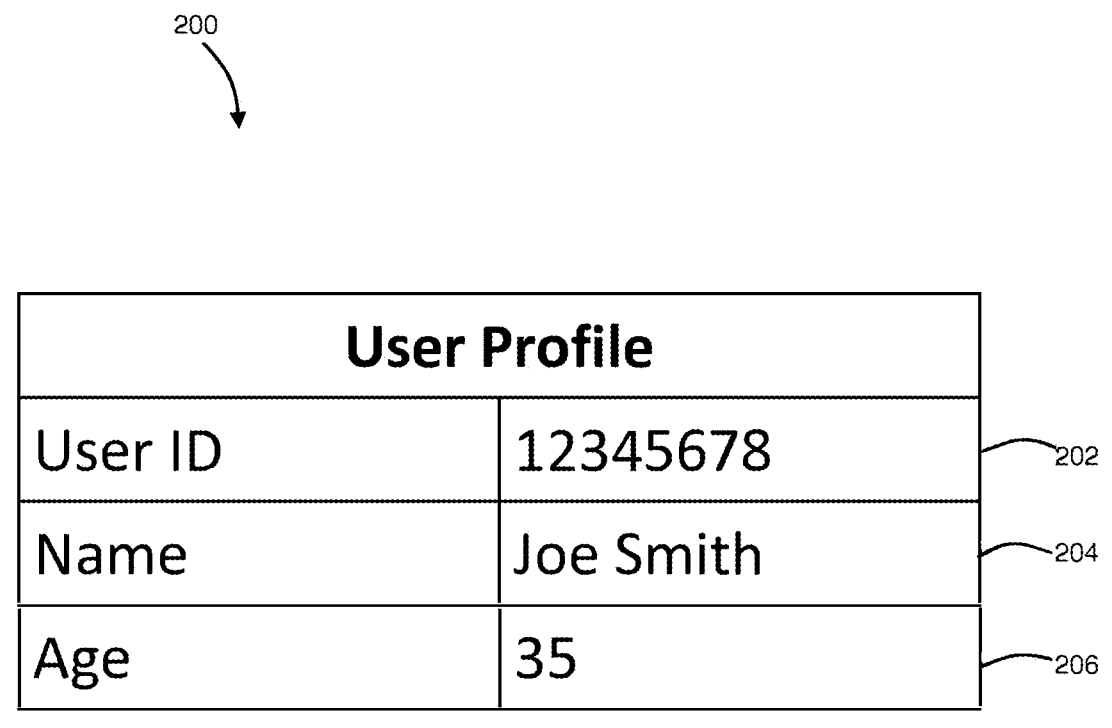

Referring to FIG. 2, an illustrative database table entry 200 for a user profile is shown. The user profile table typically resides on server 104. The table may be populated by the user with information provided via a user profile interface 114 on the wireless handset 108. In some embodiments, the user enters user profile information using an interface on a home computer or other device having access to the internet. The user profile table may comprise fields to store information such as a user ID 202, name 204, and age 206. The profile table may store additional information such as a user address.

Figure 3A:
FIG. 3A shows an illustrative database table entry for a user attribute table.

Referring to FIG. 3A, an illustrative database table entry 300 for a User Attribute Table is shown. The user attribute table may be located on wireless handset 108 or on user profile component 114 of system database 112 on server 104. Locating the user attributes table on the wireless handset protects user privacy by maintaining information in a location where the user has control over the information. The user attribute table may comprise fields for storing a user ID 302, an unique attribute identifier 304, an attribute category 306, and an attribute value 308. Attributes may be linked to a single user in a many-to-one relationship through use of a user attribute table. Attribute category "Game" may have several attribute values associated with it, such as "Blackjack," "Poker," "Slots," and "Keno." Entry 300 links the user ID 202 of FIG. 2 with the attribute value "Blackjack". The data stored in entry 300 indicates that user 12345678 has an interest in the game blackjack. This is information that may have been provided by the user through an interface on a wireless handset 108 or other device. In some embodiments, the user attribute table comprises entries generated by a content administrator. For example, the user attributes table may contain an entry associating a user ID with attributes indicating the user's transactional history with the merchant.

In some embodiments, the user profile table and user attributes table are located on the wireless handset 108. Locating the tables containing user information on the wireless handset protects user privacy by storing information in a location where the user has control over the information.

Figure 3B:
FIG. 3B shows an illustrative database entry for an attribute group table.

Referring now to FIG. 3B, an illustrative database table entry 320 for an Attribute Group Table is shown. Each entry in the attribute group table associates a user ID 322 with an attribute ID 324. The attribute group table may be populated with values stored in the User Attribute Table on a periodic basis, such as an hourly, daily, or weekly basis. In some embodiments, the attribute group table is updated every time the user attribute table is changed. The use of an attribute group table increases the efficiency of delivering content to users.

Figure 4:
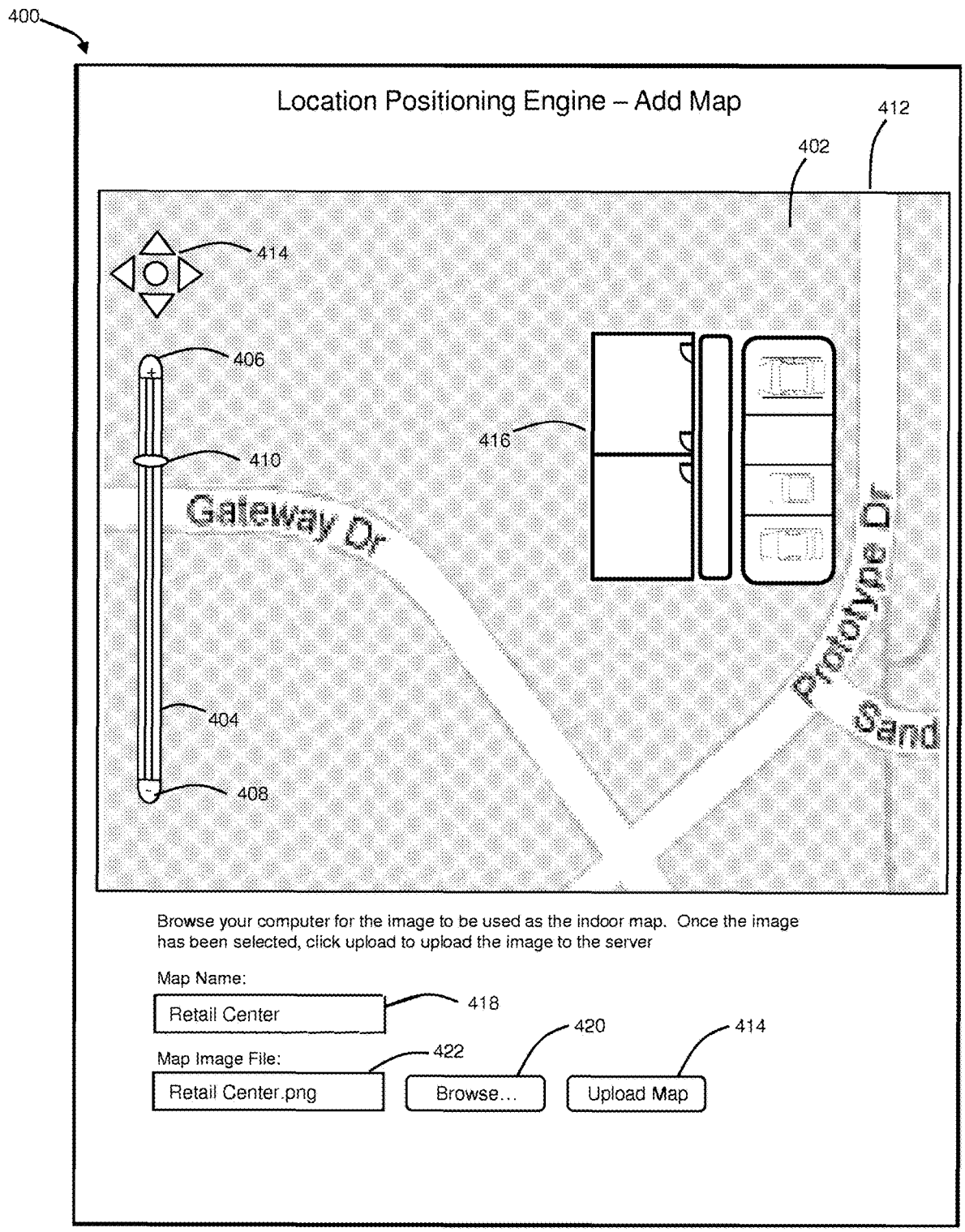
FIG. 4 shows an illustrative geographic information system interface.
Figure 5:
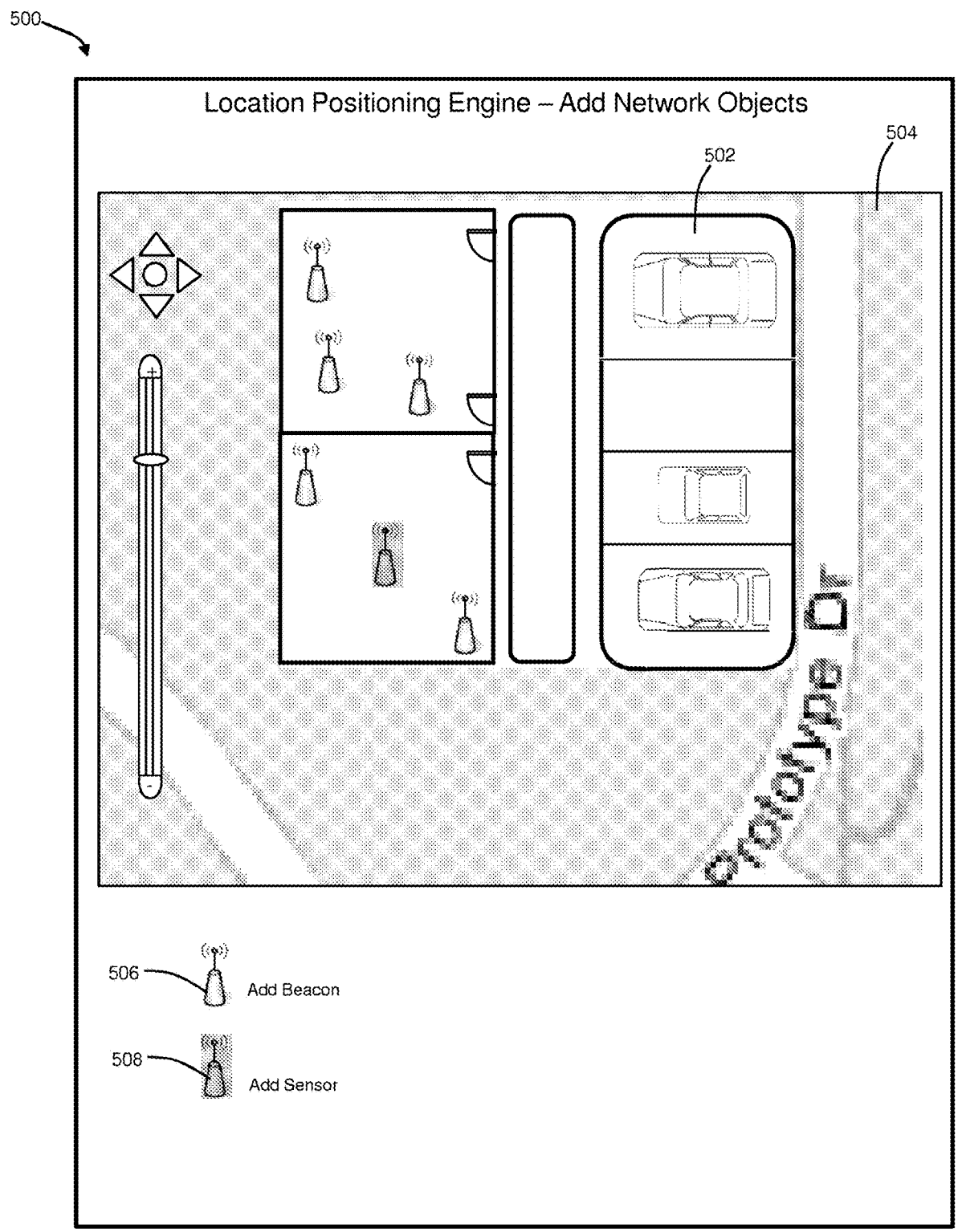
FIG. 5 shows an illustrative network object placement interface.

FIGS. 4 and 5 illustrate the location and positioning module 124 of the merchant interface 110. The location and positioning module comprises a geographic system interface and a network object placement interface.

Referring to FIG. 4, an illustrative geographic information system (GIS) interface 400 is shown. The content administrator may indicate the location of a map of the merchant premises relative to a street map using the GIS interface. The content administrator may use magnification bar 404 to adjust the magnification of street map 402 to the appropriate scale for placement of the merchant premises map. Magnification bar 404 comprises increase magnification indicator 406, decrease magnification indicator 408, and sliding magnification control 410. The content administrator may slide the sliding magnification control 410 in the direction of the increase magnification indicator 406 to increase the level of magnification of the map and may slide the sliding magnification control 410 in the direction of the decrease magnification indicator 408 to reduce the level of magnification of the map. To change the position of the street map 402 within map window 412, navigation control 414 may be used. Navigation control 414 comprises an up arrow, a down arrow, a left arrow and a right arrow. To move the street map in the desired direction, the arrow pointing in the desired direction is mouse clicked. Navigation may additionally or alternatively be accomplished by mouse clicking on street map 402, holding down the mouse button, and moving the mouse to slide the map in the desired direction. It will be recognized that other methods for adjusting map magnification and map position within the map window may be used.

When the appropriate level of magnification has been reached, the content administrator may insert a merchant premises map image 416 over the street map and position the premises map relative to the street map. The content administrator may be prompted to enter a name for the premises map in a text box such as map name text box 418. The content administrator selects a map image file to insert over the street map. For example, the content administrator may click a Browse button 420 to open a dialog box allowing the content administrator to choose a map image file from a file directory. When an image file has been selected, the name of the image file may appear in a text box as shown at 422. The content administrator may then upload the selected map, for example, by hitting an upload map button 414. After the map is uploaded, it appears within map window 412. The premises map image 416 may be resized and rotated with mouse controls or other interface controls. The content administrator may place the premises map image 416 in the appropriate position relative to street map 402. For example, the content administrator may place the premises map image by mouse clicking on the premises map image, holding down the mouse button, and dragging the premises map image to the desired position. It will be recognized that other methods for selecting a map image and positioning it at a desired location on a street map may be used. The position of premises map 416 relative to street map 402 is stored in the location and positioning component 118 of system database 112. The database may also store the level of magnification and position of street map 402 within map window 412. The image file or a string representing a path to the image file may also be stored in the database. Additionally, the map name entered in text box 418 may be stored in the database.

Referring to FIG. 5, an illustrative network object placement interface 500 is shown. The network object placement interface allows the content administrator to place network object icons on the merchant premises map to indicate the location of the network objects on the merchant premises. Network objects comprise beacons and sensors. A beacon transmits a signal containing identifying information to the wireless handset. A beacon may be, for example, an access point or femtocell. A sensor receives signals from one or more beacons and transmits beacon status information to server 104 via the wireless network 106. To add a beacon icon to the premises map 502, the content administrator mouse clicks the beacon icon 506 and a beacon icon appears in map window 504. The content administrator then drags the beacon icon to the desired location on merchant premises map 502. To add a sensor icon to the premises map, the content administrator mouse clicks the sensor icon 508 and a sensor icon appears in map window 504. The content administrator then drags the sensor icon to the desired location on merchant premises map 502. It will be recognized that a variety of other methods for indicating the location of network objects on a premises map may be used. The locations of any beacons or sensors placed on the premises map are stored in the location and positioning component 118 of system database 112.

Figure 6A:
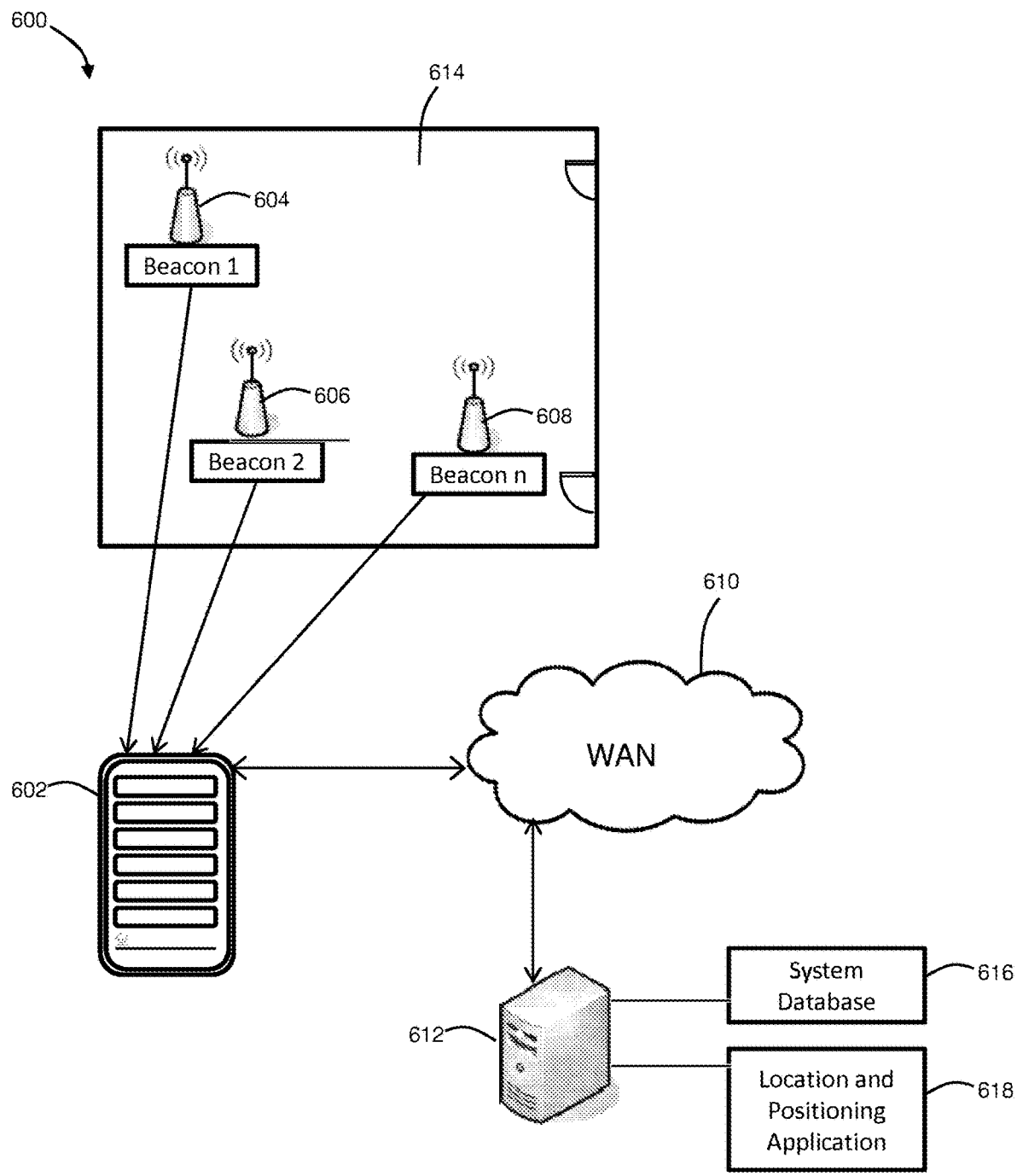
FIG. 6A-6B show illustrative system diagrams for a location positioning engine.

Referring to FIG. 6A, an illustrative system diagram 600 for a location positioning engine is shown. The location positioning engine comprises wireless handset 602, a plurality of beacons 604-608, wireless network 610, and server 612. A content administrator has indicated the location of beacons 604-608 on a merchant premises map 614 using, for example, the interface discussed in FIG. 5. As the wireless handset user moves through the premises indicated by premises map 614, the wireless handset 602 receives signals from one or more of the plurality of beacons 604-608. The wireless handset 602 sends information regarding the signals received from the beacons to server 612 via wireless network 610. Server 612 of FIG. 6A is the same server shown at 104 in FIG. 1 and contains the same system database comprising a location and positioning component 118.

In one embodiment, a location and positioning application 618 on server 612 receives from wireless handset 602 a Service Set Identifier (SSID) and signal strength value for each beacon from which the wireless handset received a signal. The application 618 compares the strength of the signals received at wireless handset 602. The application determines that the wireless handset is closest to the beacon from which the wireless handset received the signal having the greatest signal strength. The application uses beacon location information stored in the location and positioning component 118 of system database 616 to determine the location of the wireless handset relative to premises map 614.

In an alternative embodiment, location and positioning application 618 compares the strength of the signals received at wireless handset 602, and determines which of the signals exceed a predetermined threshold value (e.g. −50 dB). The application determines that the wireless handset is located proximate to the beacon from which a signal exceeding the threshold level was received.

In some embodiments, an application on the wireless handset 602 determines the location of the wireless handset relative to premises map 614 using signal strength information received from the beacons 604-608 and beacon location information retrieved from the location and positioning component 118 of system database 616 residing on server 612. The location may be determined on the basis of the strongest signal received at the wireless handset. Alternatively, the location may be determined on the basis of a comparison between the signals received and a predetermined threshold value.

Figure 6B:
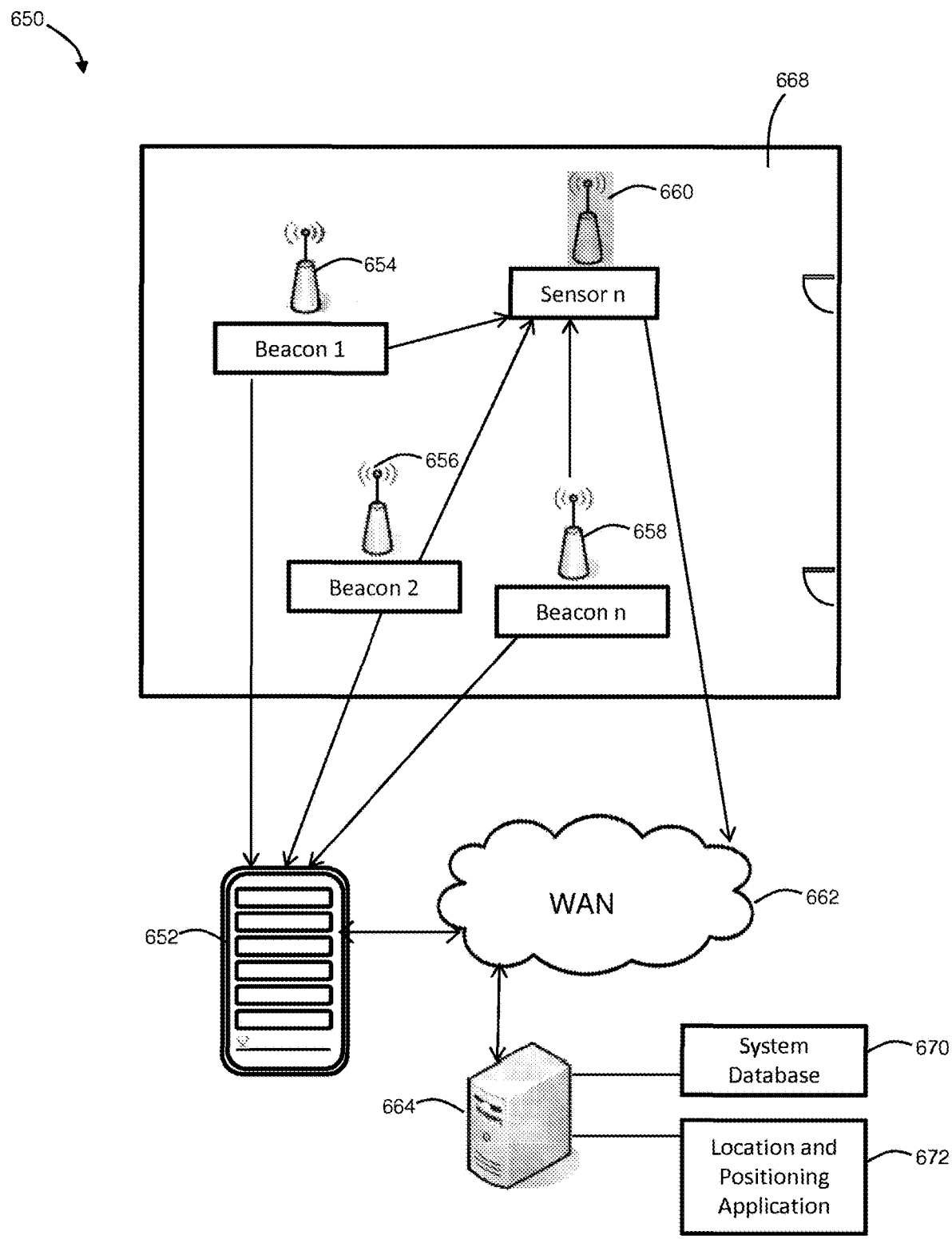

Referring to FIG. 6B, a second illustrative system diagram 650 for a location positioning engine is shown. The location positioning engine comprises wireless handset 652, a plurality of beacons 654-658, at least one sensor 660, wireless network 662, and server 664. A content administrator has indicated the location of beacons 654-658 and sensor 660 on a merchant premises map 668 using, for example, the interface discussed in FIG. 5. As the wireless handset user moves through the premises indicated by premises map 668, the wireless handset 652 receives signals from one or more of the plurality of beacons 654-658. The wireless handset 652 sends information regarding the signals received from the beacons to server 664 via wireless network 662. Server 664 of FIG. 6B is the same server shown at 104 in FIG. 1 and contains the same system database comprising a location and positioning component 118. Sensor 660 receives signals from one or more of the plurality of beacons 654-658. The sensor sends information regarding the signals received from beacons 654-658 to server 664 via wireless network 662. The information may be stored in system database 670. If one or more of beacons 654-658 is offline, sensor 660 relays the information to server 664. The beacon signal strength information provided by sensor 660 to server 664 may allow the location and positioning application 672 to update the position of beacons relative to premises map 668 as stored in location and positioning component 672 of system database 670 residing on server 664. Preferably, more than one sensor is used to determine the changed position of a beacon.

The position of wireless handset 652 relative to premises map 668 is determined in a similar manner to that described with reference to FIG. 6A by a location and positioning application 672 running on server 664 or an application running on handset 652. The addition of a sensor 660 allows for updated beacon status and location information which improves accuracy in the determination of the position of wireless handset 652.

Figure 7:
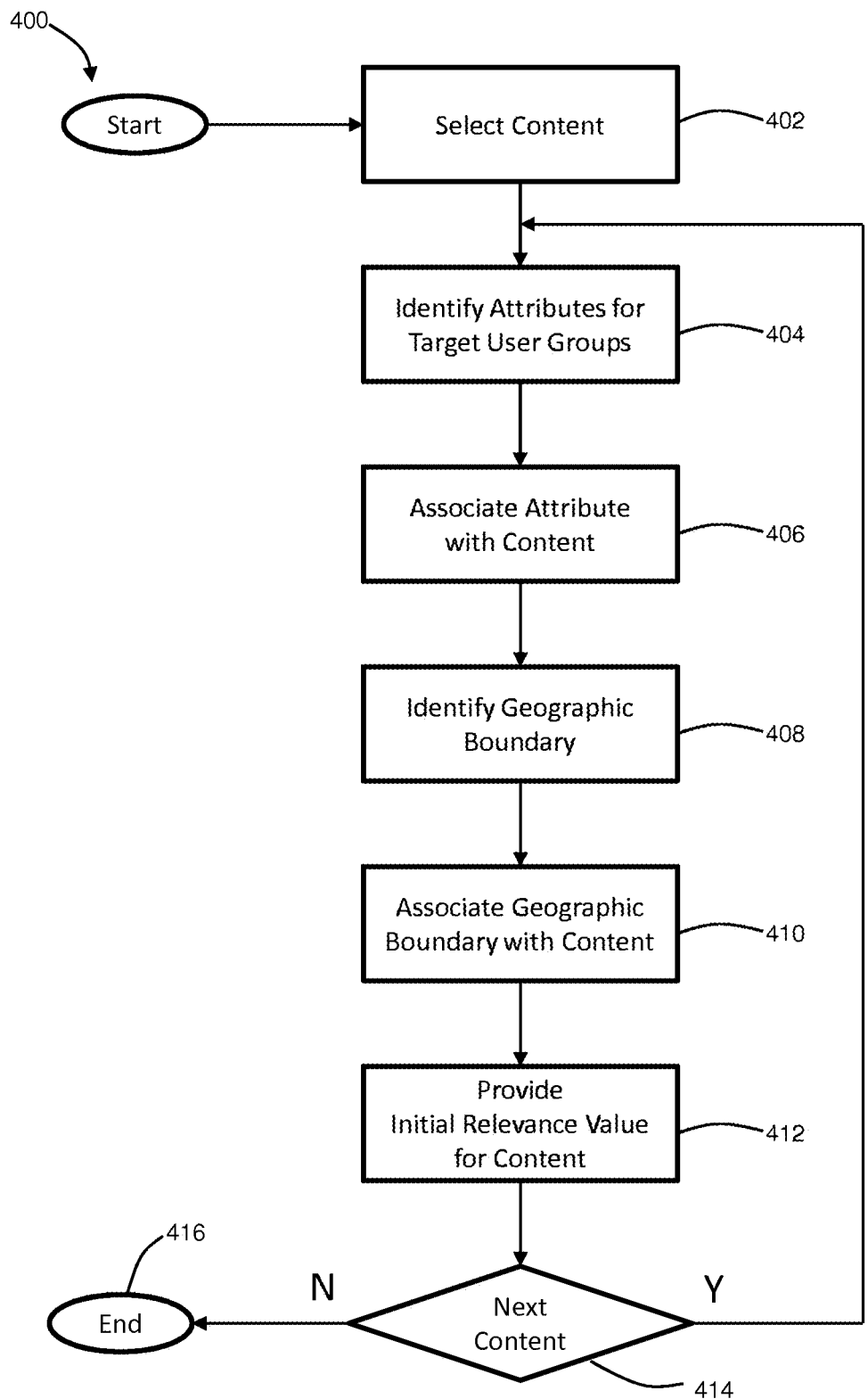
FIG. 7 shows an illustrative flow chart for associating content with one or more geographic boundaries and optionally one or more user attributes.

Referring to FIG. 7, an illustrative flow chart for associating content with a user attribute is shown. The method begins at block 402, in which the content administrator chooses a content item. A content item may be any information or product promotion which the merchant shares with a user. For example, content may include a product location, product details, event information, or a coupon. A content item may also be a link to one or more content items, such as a restaurant menu that links to a list of menu items. In some embodiments, a content item may be an application, such as a purchasing or gaming interface.

The method proceeds to block 404, in which the content administrator optionally identifies user group attributes to associate with a content item. For example, if a content item "Casino Floor" was selected at block 402, the content administrator may wish to associate group attributes indicating an interest in gaming activities with the content item. The content item "Casino Floor" may be a link leading to a list of casino floor activities, such as a 21 Tournament. The content administrator may wish to associate user attributes indicating an interest in the game blackjack with the content item 21 Tournament. At block 406, the content administrator associates the selected user attributes with the selected content item.

In some embodiments, the merchant is prevented from accessing some or all of the information stored in the user profile. User privacy may be protected by restricting merchant access to sensitive user information. For example, the merchant may be able to determine how many users fall within a particular age range without being able to access the user attribute indicating user age for a particular user.

At block 408, the content administrator uses content bubble module 125 to define a geofence on or near a merchant property. The geofence is a virtual boundary line enclosing part or all of a merchant space. The area within the geofence is described as a content bubble because the content administrator may associate the geofenced area with one or more content items. Content bubbles are described further below with reference to FIG. 6. At block 410, the content administrator may associate a content bubble defined by the geofenced area with the selected content.

At block 412, the content administrator provides an initial relevance value for the content item. The initial relevance value indicates the applicability of the selected content item for the selected group attribute as perceived by the content administrator. For example, for the content item 21 Tournament, the content administrator may assign a higher initial relevance value for the user attribute value blackjack than the content administrator would assign for the user attribute value poker, since a user who has indicated an interest in blackjack may be more likely to be interested in a 21 Tournament than a user who has indicated an interest in poker.

At decision diamond 414, the content administrator may proceed to the next content item if the content administrator wishes to associate a next content item with a next user attribute value. If the content administrator has made all assignments, the method ends.

In some embodiments, the content administrator may also exclusively associate a group attribute with a content item. For example, if the content administrator intends for the content item Room Service to be hidden from users who are not staying in a room on the premises, the content administrator may exclude such users from receiving the content item. The group attribute corresponding to users not staying on the premises is excluded from association with the content item Room Service.

Referring to FIG. 8A, an illustrative content administrator interface 800 for creating content connections is shown. The content administrator may use the interface shown in FIGS. 8A-8B to carry out optional association of content items with user attributes as indicated in FIG. 7. The content administrator selects a content item from a predefined list of content items as shown in the drop down menu 802. The list of content items is comprised of content previously uploaded by the content administrator and stored in the database. In the illustrative example shown in FIG. 8A, the content administrator has chosen the content item "Casino Floor."

The content administrator chooses a group attribute to associate with the content item using drop down menus 804 and 806. At menu 804, the content administrator chooses attribute type "Age Range." In menu 806, the content administrator has selected the attribute value "21 and over" to associate with the selected content item. Only those users who are above the age of 21, as indicated in the user profile stored in the user profile component 114 of system database 112, will receive the content specified in menu 802.

In some embodiments, the merchant may associate content items with merchant generated attributes. Merchant generated attributes are attributes associated with a user that were not specified by the user. For example, a merchant generated attribute may include past user gaming history, such as a history of using slot machines.

The content administrator is provided with a level menu 808. The level indicates whether the content item is a parent item, such as a standalone link or a link to a submenu, or a child item, such as a submenu content item. As shown at 808, the content administrator has specified that content item Casino Floor is a level 1 item. This indicates that the Casino Floor content item is a top level content item which may serve as a parent to a set of lower level content links.

The content administrator may assign an initial relevance value to the content-attribute association created in tables 802-806. The initial relevance value may be a numerical value, such as a number falling in the range of 1-100, with 1 indicating minimum relevance and 100 indicating maximum relevance. As shown in 810, the content administrator has chosen an initial relevance weighting value of 90.

Referring to FIG. 8B, a second illustrative content administrator interface 850 for creating content connections is shown. The content administrator may desire to associate content items comprising a submenu to a top level content item. For example, the content administrator may wish to create a submenu for content item Casino Floor. The submenu may contain, for example, content item "21 Tournament." To create the submenu, the content administrator selects the desired submenu content item from Content Item menu 852. The content item 21 Tournament has been selected from Content Item menu 852. The content administrator then creates content connections to associate one or more user attributes with the content item. For example, in drop down menu 854, the content administrator has chosen the user attribute type Game. The content administrator may wish to associate the content item(s) with an attribute type without specifying an attribute value. For example, the content administrator may choose to associate the selected content item 21 Tournament with all users who have selected user attribute type Game.

Alternatively, the content administrator may wish to associate the selected content items with a group attribute having a particular value. In menu 856, the content administrator has selected the attribute value "Blackjack" to associate with the selected content items. Only those users who have indicated an interest in Blackjack through the user attributes associated with their user profiles will receive the content specified in menu 852.

To indicate that the content item selected, 21 Tournament, is linked to a parent content item, the content administrator sets the level to a value that is one greater than the value of the parent level. Thus, since 21 Tournament is an item in a submenu of menu item Casino Floor, 21 Tournament is give a level value of 2, which is one greater than the Casino Floor level value of 1. If the level value is greater than one, a Parent Content Item menu appears as shown at 862. The parent content item menu is populated with all content items having a level value that is one fewer than the level value specified in 860. Thus, since Casino Floor was given a level value of 1, which is one fewer than the level value specified in 860, the content item Casino Floor appears in the Parent Content Item menu. The content administrator chooses the parent content item, for example, Casino Floor, to assign the level 2 content item 21 Tournament to level 1 content item Casino Floor.

If the content administrator wishes to create additional level 2 submenu items under level 1 menu item Casino Floor, the content administrator adds new content item associations, specifying a level value of 2 and a parent item of Casino Floor. The content administrator may also create submenus of submenus by creating a level 3 content item and specifying a level 2 parent content item for the level 3 content item.

As for the parent content items, the content administrator may assign an initial relevance value to the child content item. As shown in 858, the content administrator has chosen an initial relevance weighting value of 80.

In FIG. 8B, the content administrator has selected "21 Tournament" from the submenu items list. A user in the age group 21 and over may receive the content item Casino Floor on the user's wireless handset, as established in the interface shown in FIG. 8A. If the user selects Casino Floor, the user will be shown a submenu comprising the content item "21 Tournament," as established in the interface shown in FIG. 8B.

In some embodiments, the content administrator is able to associate additional filters with the content item user attribute association. The content administrator may wish to serve content to a user based on a time range, date, or user location. For example, the content administrator may associate a content item such as a coupon for coffee with a time range, such as 7:00 AM to 11:00 AM, so that the coupon is delivered to users during this time range. In a second example, the content administrator associates a coupon for coffee with a time range and with a user attribute indicating a user preference for coffee. In the second example, only those users that have specified a preference for coffee receive the coffee coupon content item during the specified time range. Content may be filtered by user location based on information provided by the user's wireless handset to the server regarding the user's location. In some embodiments, the content administrator may associate a content item with a time, date, location, or other filter without associating the content item with a user attribute. In other embodiments, the content administrator may be able to provide content items to all users by indicating no filter is to be applied to such content items.

Figure 9:
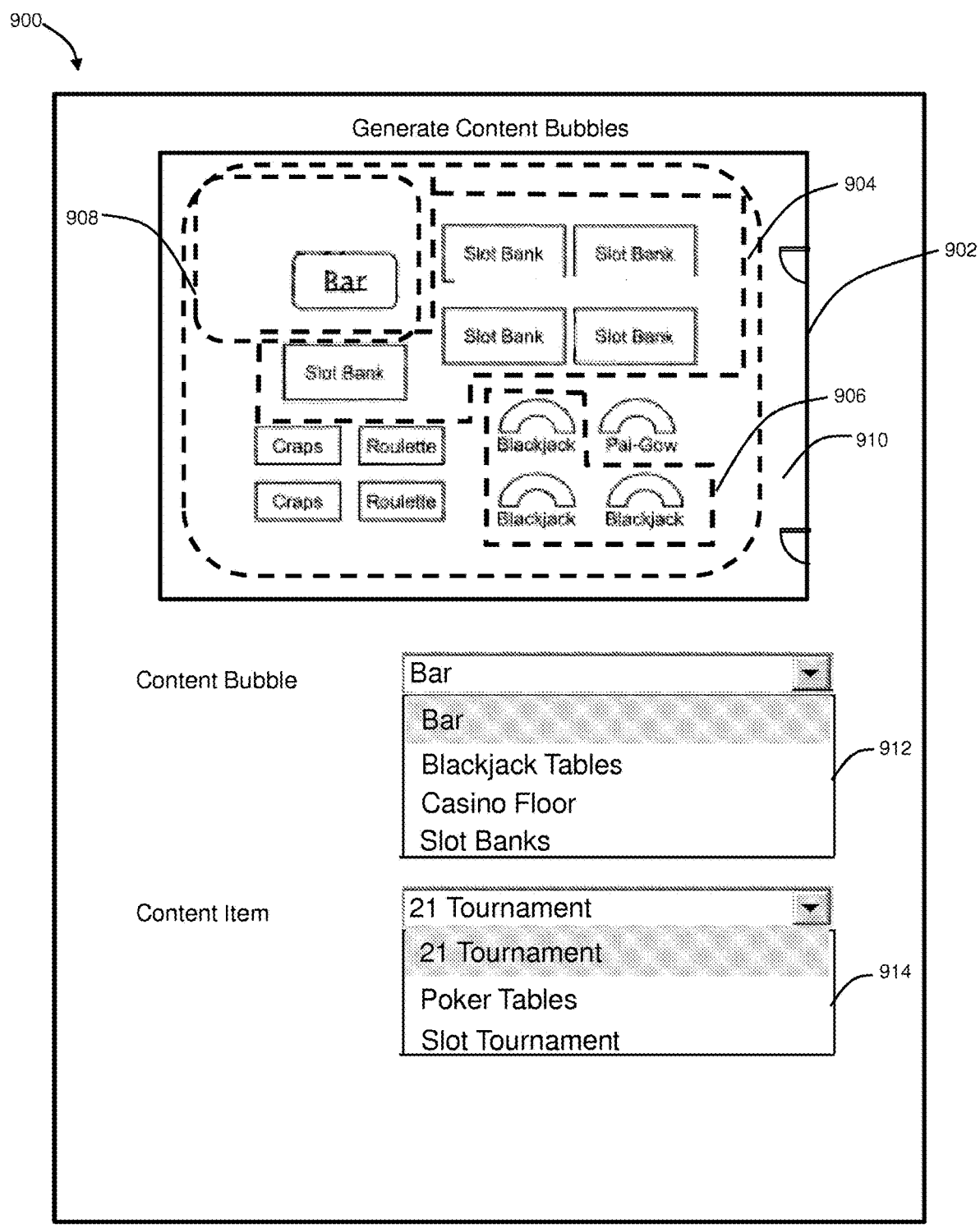
FIG. 9 shows an illustrative content bubble generation interface.

Referring to FIG. 9, an illustrative content bubble generation interface 900 is shown. The content administrator uses the content bubble generation interface to define one or more sections of the area on or near a merchant premises with which the content administrator wishes to associate content items. The content administrator provides a map 902, such as a premises floor plan, on which the content bubbles will be defined. The map may be provided by uploading an image file to the content administrator interface. Multiple content bubbles may be defined for a single merchant area. The content bubbles may overlap.

In FIG. 9, content bubbles 904, 906, 908 and 910 have been defined, corresponding to the Slot Banks area, the Blackjack Tables area, the Bar area, and the entire Casino Floor, respectively. The interface comprises a Content Bubble selection drop down menu 912 and a Content Item selection drop down menu 914. Content bubble 908 corresponding to the bar area has been selected from Content Bubble menu 912. The content administrator has chosen from Content Item menu 914 the content item 21 Tournament. The information entered in the interface shown in FIG. 8 is used to determine which users will receive the content items designated in menu 914. In FIG. 8B, the content item 21 Tournament was associated with a user having a user attribute indicating a preference for blackjack. Because this content item has been associated with content bubble 908 (the Bar area), when a user having the blackjack preference moves into the Bar content bubble, the user will receive the 21 Tournament content item.

Figure 10:
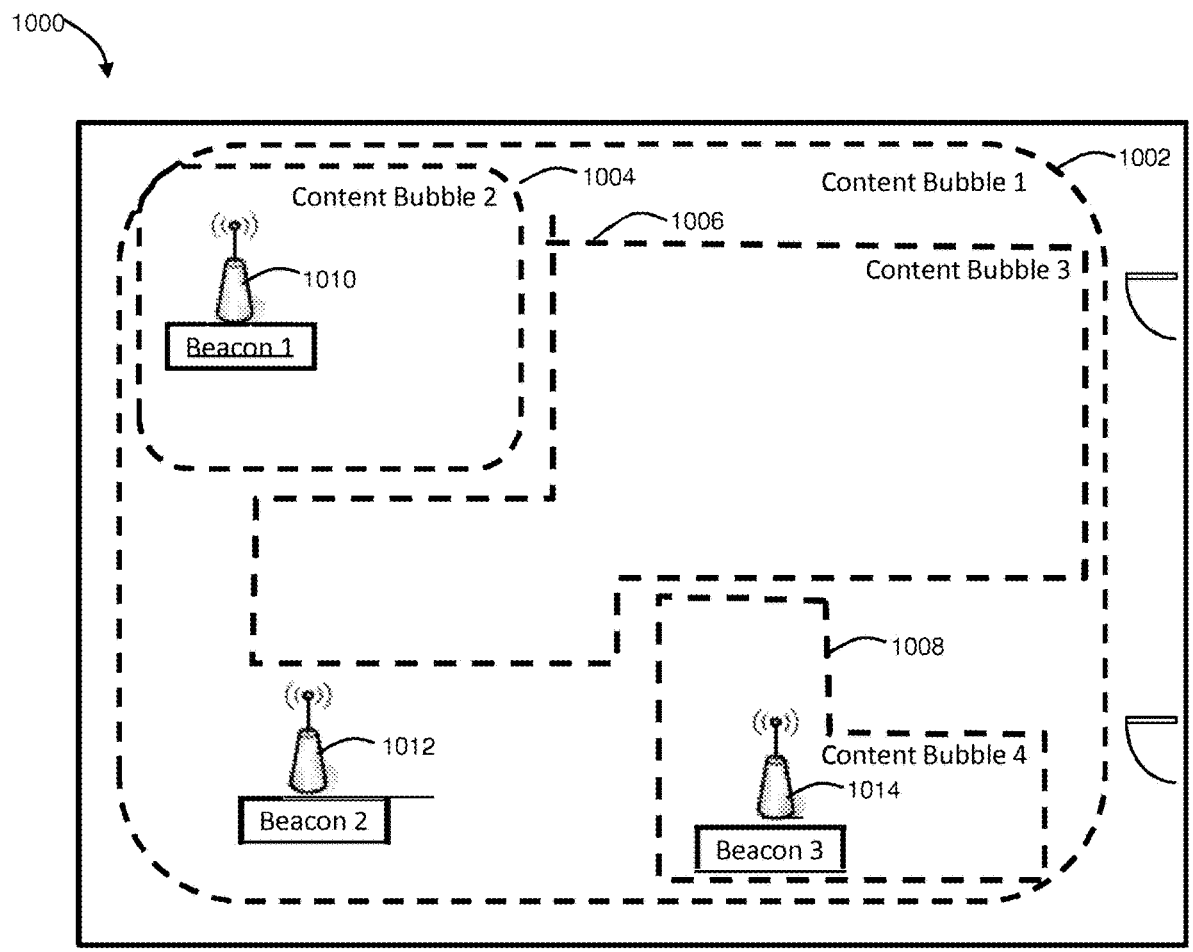
FIG. 10 shows an illustrative content bubble layout showing the placement of a plurality of network objects.

Referring to FIG. 10, an illustrative content bubble layout 1000 with network object placements is shown. Content bubbles 1, 2, 3 and 4 are shown at 1002, 1004, 1006, and 1008, respectively. Network object 1010 is Beacon 1, located within the boundary of Content Bubbles 1 and 2. Network object 1012 is Beacon 2, located within the boundary of Content Bubble 1. Network object 1014 is Beacon 3, located within Content Bubbles 1 and 4.

Referring now to FIGS. 11A-11E, illustrative examples of wireless handset positions as determined from received signals are shown. The tables of FIGS. 11A-11E indicate the determined position of a wireless handset relative to the content bubbles shown in FIG. 10.

In FIGS. 11A-11B, the position of the wireless handset is determined according to the maximum signal strength received from the beacons detected by the wireless handset. In FIG. 11A, the wireless handset has received signals from Beacons 1, 2 and 3 having signal strengths of −45 dB, −50 dB, and −60 dB respectively. Because Beacon 1, shown at 1010 in FIG. 10, has the greatest signal strength as received at the wireless handset, the wireless handset is determined to be within Content Bubble 2. Because Content Bubble 1 comprises nearly all of the premises shown in FIG. 10, the wireless handset is also determined to fall within Content Bubble 1. The wireless handset may receive content associated with the bounded areas indicated by Content Bubbles 1 and 2.

In FIG. 11B, the wireless handset has received signals from Beacons 1, 2 and 3 having signal strengths of −45 dB, −50 dB, and −45 dB respectively. Because the wireless handset has received the same signal strength from both Beacon 1 and Beacon 3, none of the beacons has a highest signal strength. In this case, the wireless handset is determined to be at a location which is an average distance between the two beacons having the greatest signal strength. The wireless handset will be determined to be at a location which is the arithmetical average of the latitudes and longitudes of Beacon 1 and Beacon 3. The wireless handset is thus determined to be located within Content Bubble 3, as Content Bubble 3 includes a position located halfway between Beacons 1 and 3. The wireless handset is also located within Content Bubble 1, as content bubble 1 comprises nearly all of the premises shown in FIG. 10.

In FIG. 11C-11D, the position of the wireless handset is determined by comparing the strength of beacon signals received at the wireless handset to a threshold signal level, such as −50 dB. The threshold signal level may also be a level in the range of −40 dB to −60 dB, or, in some embodiments a threshold level in the range of −20 dB to −70 dB may be used. In FIG. 11C, the wireless handset has received signals from Beacons 1, 2 and 3 having signal strengths of −45 dB, −60 dB, and −55 dB respectively. Assuming a threshold signal level of −50 dB, only the signal from Beacon 1 exceeds the threshold. Because Beacon 1, shown at 1010 in FIG. 10, has the only signal exceeding the threshold level, the wireless handset is determined to be within Content Bubble 2. Because Content Bubble 1 comprises nearly all of the premises shown in FIG. 10, the wireless handset is also determined to fall within Content Bubble 1.

In FIG. 11D, the wireless handset has received signals from Beacons 1, 2 and 3 having signal strengths of −55 dB, −55 dB, and −55 dB respectively. Assuming a threshold signal level of −50 dB, none of the signals received from Beacons 1, 2 and 3 exceed the threshold signal level. Thus, the position of the wireless handset relative to the content bubbles shown in FIG. 10 cannot be determined and the wireless handset is determined to be located within none of Content Bubbles 1, 2, 3 and 4. The wireless handset may not receive content items associated with the boundaries represented by Content Bubbles 1, 2, 3 and 4.

In some embodiments, the position of the wireless handset is determined by a combination of maximum received signal strength and threshold signal level. For example, the position may be determined according to a maximum received signal strength, provided the maximum received signal strength exceeds the threshold level. This approach is applied in FIG. 11E, in which the wireless handset has received signals from Beacons 1, 2 and 3 having signal strengths of −25 dB, −30 dB, and −25 dB respectively. Assuming a threshold signal level of −50 dB, all of the signals received from Beacons 1, 2 and 3 exceed the threshold signal level. Thus, the position of the wireless handset relative to the content bubbles shown in FIG. 10 is determined to be located within Content Bubbles 1, 2, 3 and 4. In another embodiment, the position of the wireless handset may be determined according to a maximum received signal strength only if none of the received signals exceed a threshold signal level.

Figure 12:
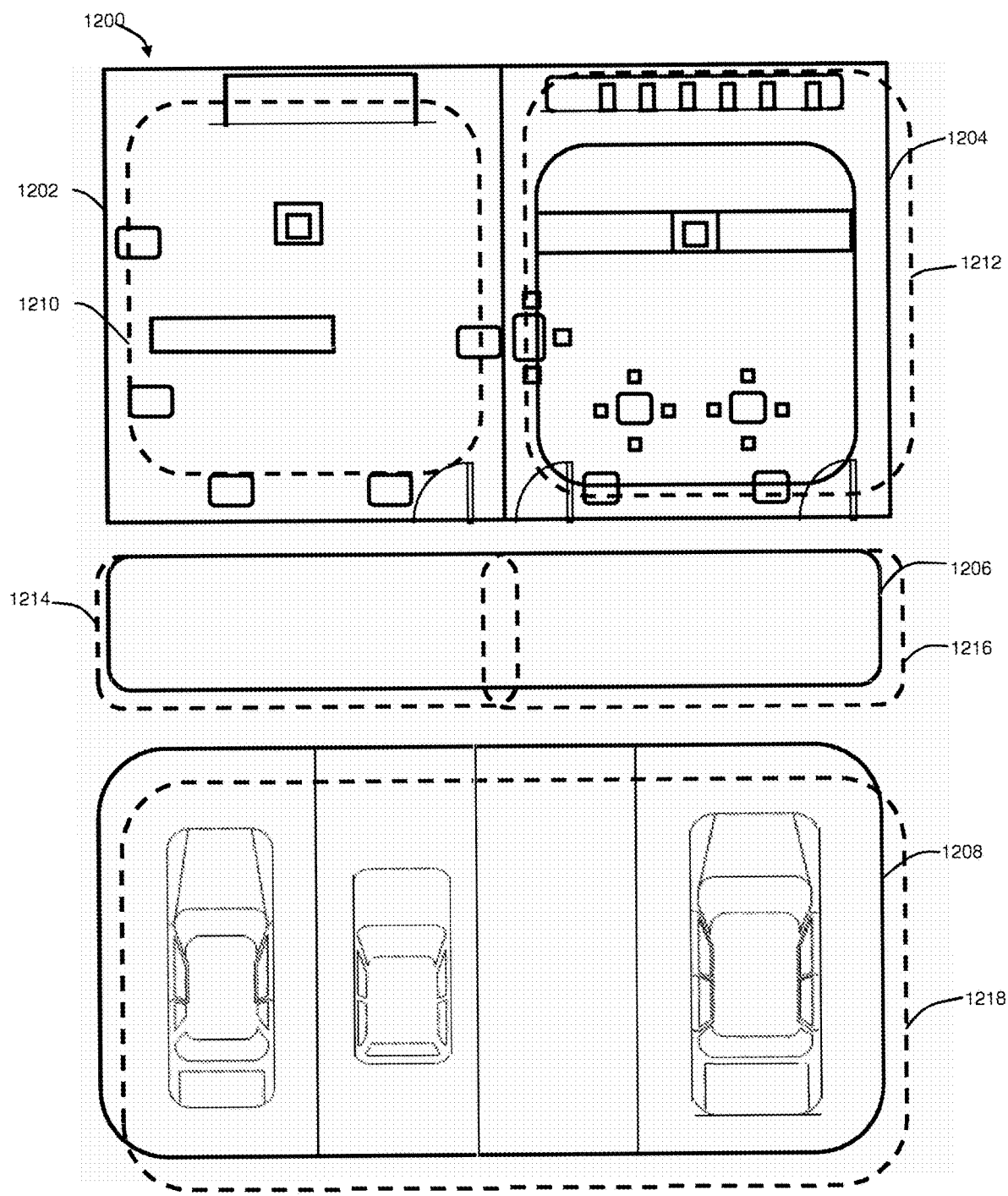
FIG. 12 shows an illustrative content bubble layout showing content bubble designations for exterior and interior spaces.

Referring to FIG. 12, an illustrative content bubble layout 1200 showing content bubble designations for exterior and interior spaces is shown. In some embodiments, the merchant may wish to provide content to users who have not yet entered a merchant premises. In FIG. 12, a content administrator has defined content bubbles surrounding parking lot and sidewalk areas proximate to the merchant premises. The map in FIG. 12 indicates a retail space 1202, a food and beverage space 1204, a sidewalk 1206 that is proximate to the retail and food and beverage space entries, and a parking lot 1208 proximate to the sidewalk. Content bubbles have been defined for the retail space and the food and beverage space as shown at 1210 and 1212, respectively. Content bubble 1214 has been defined for the sidewalk space in front of retail space 1202 and content bubble 1216 has been defined for the sidewalk space in front of food and beverage space 1204. A content bubble 1218 has been defined for the parking lot area 1208.

Figure 13:
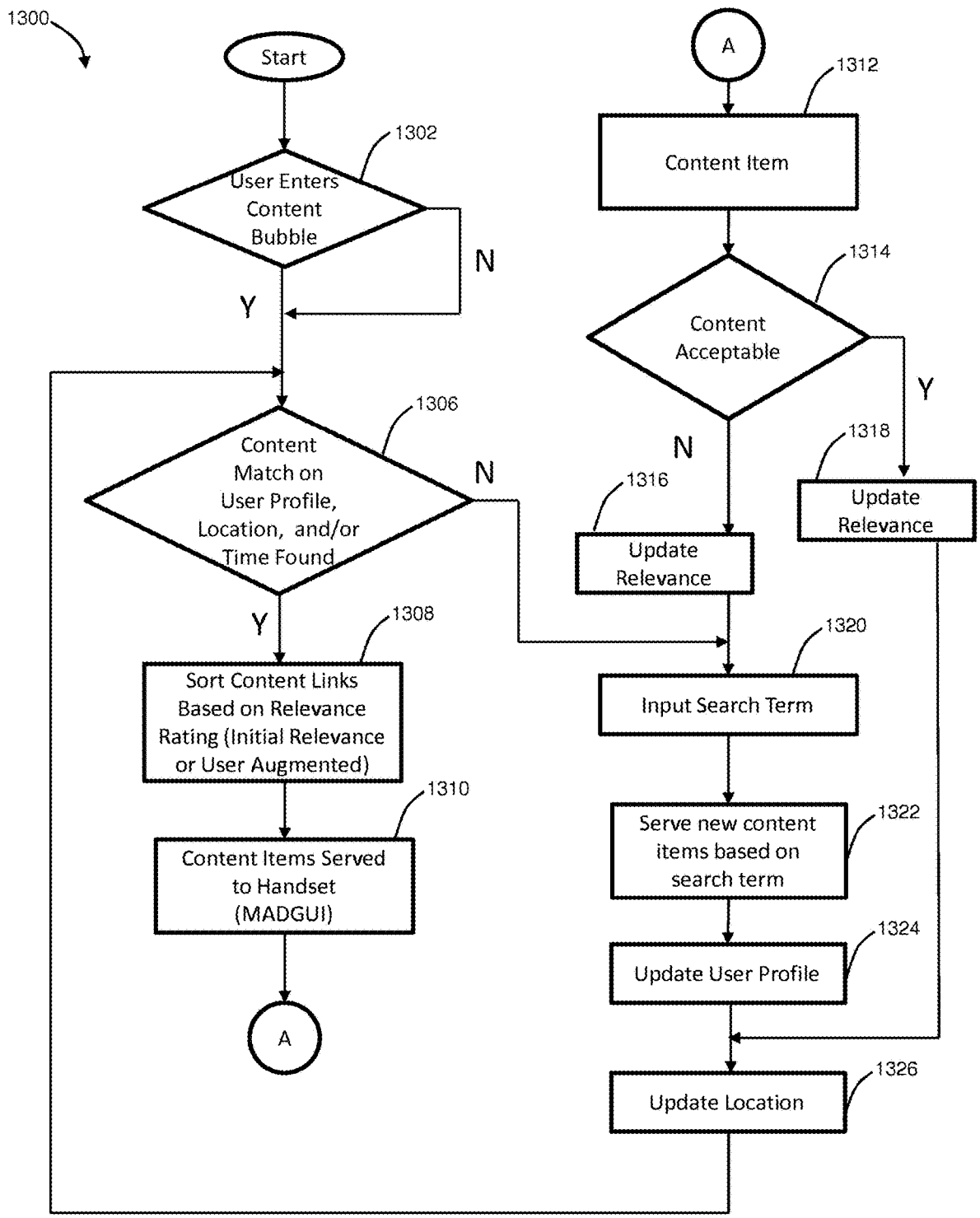
FIG. 13 shows a flow chart illustrating a method for delivering content to a user.

Referring now to FIG. 13, a flow chart 1300 illustrating a method for delivering content to a user is shown. The method begins at decision diamond 1302, in which the handset application running on wireless handset 108 continually sends the user location to server 104 and the server determines whether the user location corresponds to the area within a content bubble.

User location relative to a content bubble may be determined as described with reference to FIGS. 6A-6B. User location may alternatively be determined by global positioning system (GPS) coordinates or signal strength from known regional wireless access points as detected by wireless handset 108.

If the user has entered a content bubble, the handset sends the user ID and location to the server. The content delivery application running on server 104 may use one or more of the location, the local time at the user location, and the user group attributes associated with the user ID to determine which content to deliver to the handset, as shown at decision diamond 1306. If no content matches are found, the user may be prompted to input a search term as indicated at block 1320, allowing the user to find relevant results.

There may be a maximum number of content items desired to be displayed on the handset. The maximum number may be determined by the content administrator or by the handset user. If the number of content matches found exceeds the number of content items to be displayed, the content delivery application may sort through the content matches to find the most relevant matches, as shown at block 1308. In some embodiments, content matches will only be displayed when a relevance value exceeds a threshold value, for example 0.5 on a scale of zero to 1. The relevance value may be based on an initial relevance value set by a content administrator. The relevance value may be updated in accordance with user feedback.

At block 1310, the selected content matches are sent from server 104 to the MADGUI running on wireless handset 108. The method continues to block 1312, in which a user selects a content item. The user may be presented with an option to provide feedback on the content item, as indicated at decision diamond 1314. User feedback may be provided via a ranking system. For example, the user may be provided with the option to rate the content item on a scale of one to five stars. The user may also be provided with the option to reject or accept the content item. In some embodiments, data on the acceptability of the content provided to the user is collected without active input of the user, for example, by tracking clickthrough rates on the content items served. The content acceptability feedback is used to update the relevance value for the content item, as indicated at blocks 1316 and 1318.

If the content is deemed acceptable, the method proceeds to update the location of the handset as indicated at block 1326.

If the content is deemed unacceptable or receives a low user rating, the user may be prompted to input a search term as indicated at block 1320, allowing the user to find preferable results. The method then proceeds to block 1322, in which new content items are served based on the results of the search performed using the entered search term. A user attribute may be added to the user profile based on the search term input by the user, as indicated at block 1324. The method then proceeds to block 1326, at which point the handset sends an updated user location to the server. The server performs a new content search based on the updated location, as indicated at decision diamond 1306.

Figures 14A, 14B:
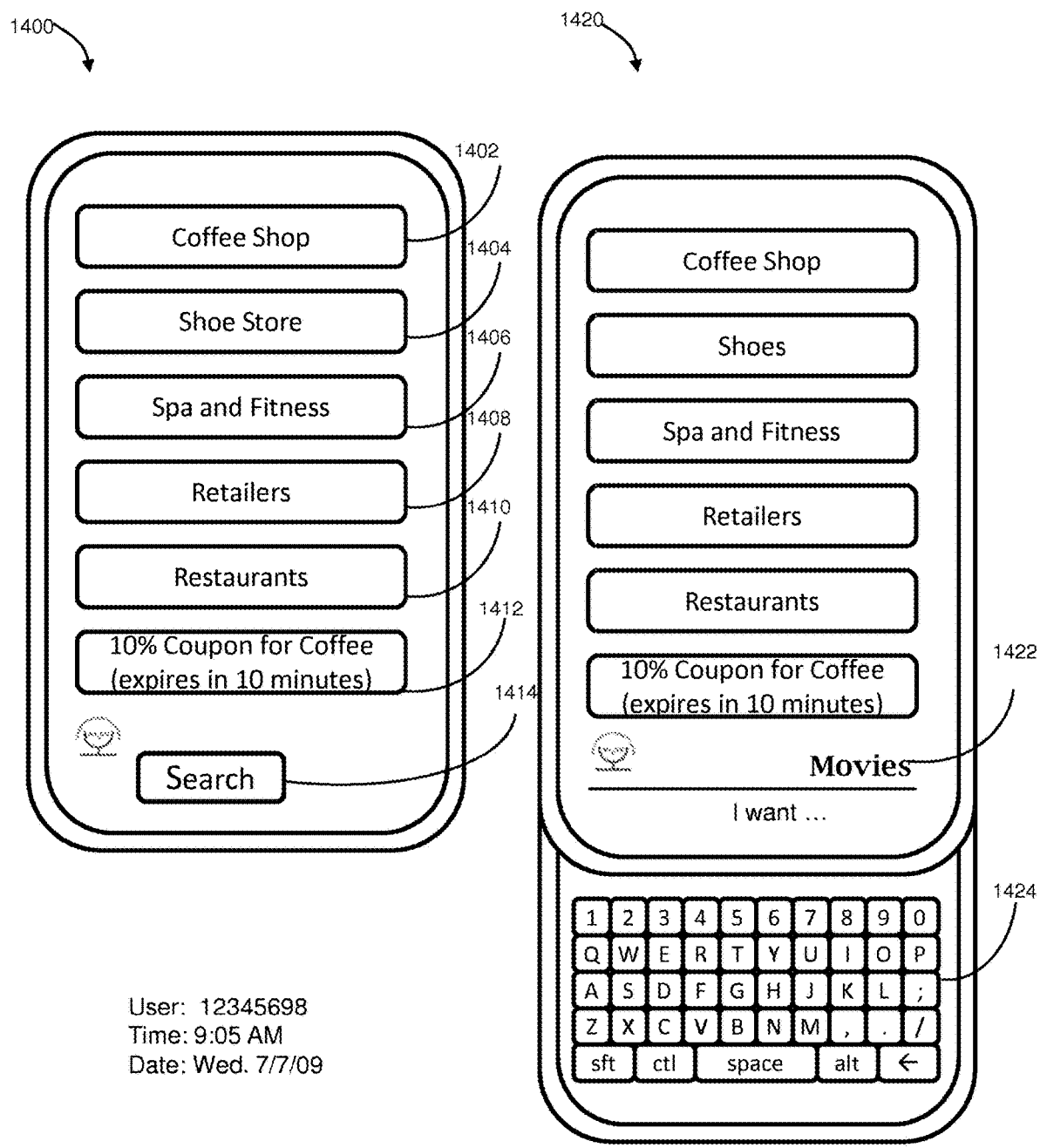
FIGS. 14A-14D shows an illustrative content interface.

Referring to FIG. 14A, an illustrative content interface (MAD GU I) is shown on a wireless handset. The handset shown is a slide phone having a retractable keypad, however, the wireless handset may be a bar-type or flip-type phone or a phone having a touchscreen interface. The MADGUI is initiated by the handset application when content matches are found as indicated in decision diamond 1306. When content matches are found, the MADGUI is populated with content matches sent from server 104. The server delivers content to the user based on the content item-user attribute associations and other filters the content administrator has specified. Wireless handset display 1400 shows Coffee Shop 1402, Shoe Store 1404, Spa and Fitness 1406, Retailers 1408, Restaurants 1410, and a 10% Coupon for Coffee 1412.

The user may have received Coupon 1412 based on a preference expressed in a user attribute. Alternatively, the Coupon may have been received based on the time of day that the user is accessing the MADGUI. For example, the content administrator may have specified that a coffee coupon is to be provided between the hours of 9 AM and 1 PM. Finally, the Coupon may have been received based on a combination of a user profile preference and another filter such as a time filter. Similarly, the other MADGUI items may be based on a user attribute-content item association provided by a content administrator, a filtering association, or a combination of user attribute and filter association with a content item.

If the user selects Restaurants 1410, the user may be provided with a submenu of restaurants in the vicinity of the user. The list of Restaurants may be filtered based on user attributes or based on the past behavior of the user. If the user selects Spa and Fitness 1406, the user may receive a submenu of services available from the Spa. The submenu of services may be filtered to include only those services the user has engaged previously. The submenu may include a coupon for a particular service or a service engaged previously.

Referring to FIG. 14B, an illustrative MADGUI prompting a user to input a search item is shown. The user may be prompted to or choose to input a search item, for example, by being shown or hitting a search button such as the button shown at 1414 in FIG. 14A, if none of the content items delivered in the MAD GU I are acceptable. In FIG. 14B, the user has entered the search term "Movies" at 1422. The user may use keypad 1424 to enter the search term. Other wireless handsets may allow search term entry using the handset's numeric keypad, touchscreen keypad, or other input device. The MADGUI application will perform a search of merchant content items applicable to the search term and present content to the user based on the results of the search.

Figures 14C, 14D:
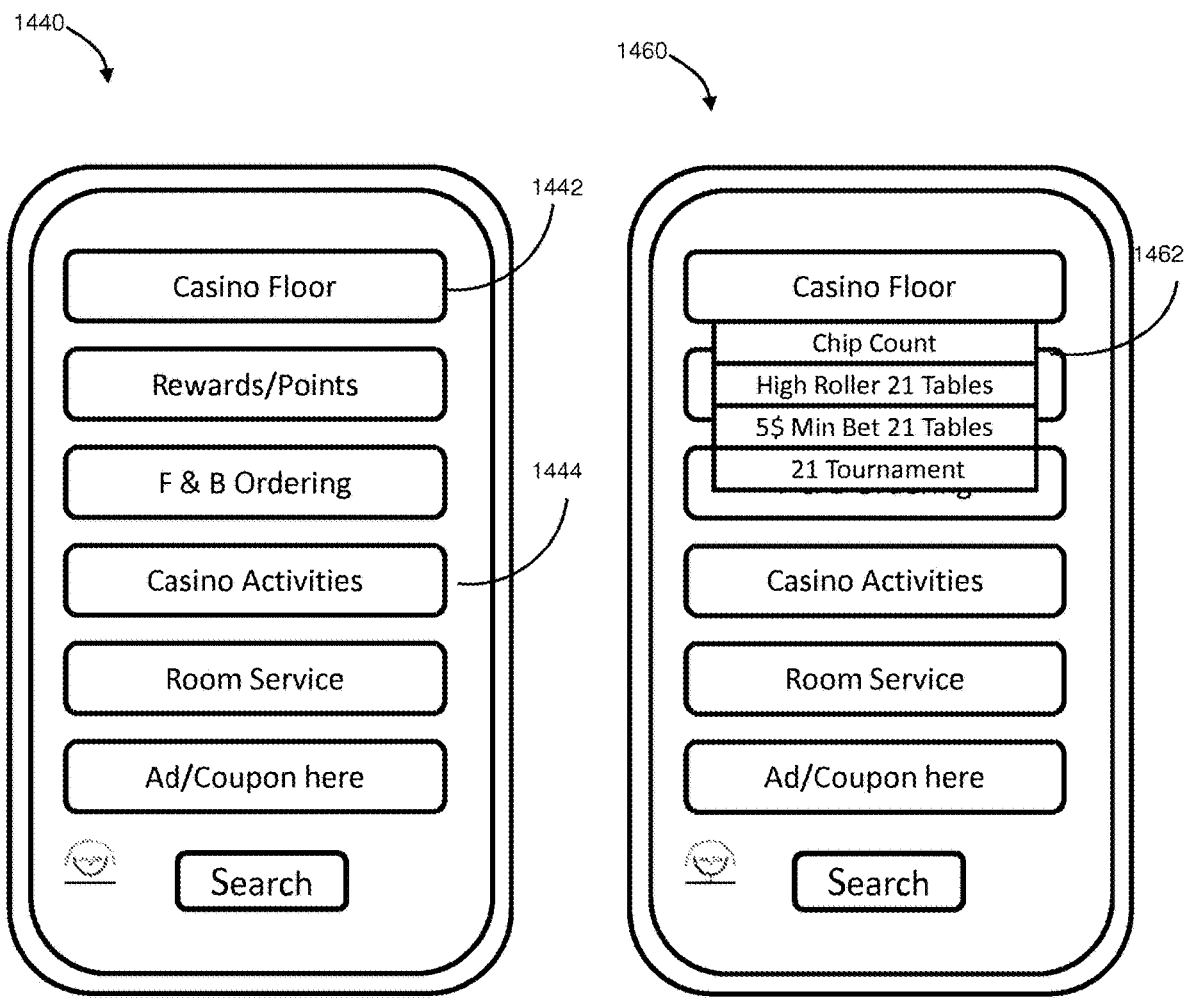

In FIG. 14C, an illustrative MADGUI presented to a user later in the day is shown. The content administrator has specified that content items such as Casino Floor 1442 and Casino Activities 1444 should be shown to the user, for example, between noon and midnight.

In FIG. 14D, an illustrative MADGUI with submenu deployed is shown. As a result of the user selecting item 1442, "Casino Floor," a submenu 1462 has been deployed. Because the user 12345678 has an age exceeding 21, content item Casino Floor may be delivered to the user's wireless handset due to the content connection established as shown in FIG. 8B. If the user has indicated an interest in blackjack, the user may also receive the content item 21 Tournament due to the content connection established as shown in FIG. 8B. The user may also receive the content item 21 Tournament if the user's wireless handset detects that the user is in the content bubble corresponding to the Bar due to the content connection established as shown in FIG. 8B. Whether the user will receive the content item may depend on factors such as the relevance weighting for the content item relative to other content items which match the user's attributes. As FIG. 14D indicates, the user has received the content item Casino Floor. The level 1 content item Casino Floor was established as the parent of level 2 content item "21 Tournament" as shown in FIG. 14D. 21 Tournament appears as a content item in submenu 1462 after the parent content item Casino Floor is selected.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. An indoor mapping system comprising:
   a physical premises map;
   a beacon disposed within a physical premises, wherein the beacon transmits a beacon signal;
   a beacon location layered on the physical premises map;
   a wireless device including an indoor positioning module, wherein the wireless device receives the beacon signal when the wireless device is within a broadcast range of beacon, and wherein the wireless device transmits the beacon signal to the indoor positioning module;
   wherein the indoor positioning module associates the received beacon signal with the beacon location;
   wherein the indoor positioning module determines from the received beacon signal that the wireless device is at the beacon location; and
   a content management module communicatively coupled to the wireless device and the indoor positioning module, wherein the content management module includes a plurality of content items, and wherein at least one content item of the plurality of content items is associated with the beacon location.

2. The indoor mapping system of claim 1 wherein the beacon is identified on the map with a map location corresponding to a unique fixed location.

3. The indoor mapping system of claim 1 wherein the wireless device including a user profile having attributes;
   wherein the content management module filters the plurality of content items based upon an association with a user profile attribute and transmits at least one filtered content item to the wireless device; and
   wherein the wireless device includes a content interface that displays the transmitted content item on the wireless device.

4. The indoor mapping system of claim 1 further comprising a geographic information system that allows a content administrator to define one or more geofences within the physical premises map.

5. The indoor mapping system of claim 3 further comprising at least one user attribute associated with each content item.

6. The indoor mapping system of claim 1 wherein the beacon location associated with a merchant premises.

7. The indoor mapping system of claim 1 wherein at least one content item of the plurality of content items includes one link or a link and an application.

8. The indoor mapping system of claim 4 wherein the geographic information system allows the content administrator to associate beacon with a geofence.

9. The indoor mapping system of claim 1 wherein the wireless device includes a mobile phone.

10. An indoor mapping method comprising:
    receiving a physical premises map;
    locating on the physical premises map a beacon, wherein the beacon transmits a beacon signal;

receiving, by a wireless device, the beacon signal when the wireless device is within a broadcast range of the beacon, wherein the wireless device includes an indoor positioning module;

transmitting, by the wireless device, the beacon signal to the indoor positioning module;

associating, by the indoor positioning module, the received beacon signal with a beacon location;

determining, by the indoor positioning module, that the wireless device is at the beacon location from the received beacon signal; and associating, by a content management module, at least one content item of a plurality of content items with the beacon location, wherein the content management module is communicatively coupled to the wireless device.

11. The indoor mapping method of claim 10 wherein the beacon is identified on the physical premises map with a map location corresponding to a unique fixed location.

12. The indoor mapping method of claim 10 wherein the wireless device includes a user profile having attributes and a content interface;

filtering, by the content management module, the plurality of content items based upon an association with a user profile attribute;

transmitting, by the content management module, at least one filtered content item to the wireless device; and displaying, by the content interface, the transmitted content item on the wireless device.

13. The indoor mapping method of claim 12 further comprising: defining, by the content management module, one or more geofences within the physical premises map using a geographic information system.

14. The indoor mapping method of claim 10 further comprising at least one user attribute associated with each content item.

15. The indoor mapping method of claim 10 further comprising associating the beacon location with a merchant premises.

16. The indoor mapping method of claim 13 wherein at least one content item of the plurality of content items includes one link or a link and an application.

17. The indoor mapping method of claim 13 wherein the geographic information system allows the content administrator to associate the beacon with a geofence.

18. The indoor mapping method of claim 10 wherein the wireless device includes a mobile phone.

* * * * *